(12) United States Patent
Roethig et al.

(10) Patent No.: US 8,098,690 B2
(45) Date of Patent: Jan. 17, 2012

(54) SYSTEM AND METHOD FOR TRANSFERRING HIGH-DEFINITION MULTIMEDIA SIGNALS OVER FOUR TWISTED-PAIRS

(75) Inventors: Wolfgang Roethig, San Jose, CA (US); Amir Bar-Niv, Sunnyvale, CA (US)

(73) Assignee: TranSwitch Corporation, Shelton, CT (US)

( * ) Notice: Subject to any disclaimer, the term of this patent is extended or adjusted under 35 U.S.C. 154(b) by 317 days.

(21) Appl. No.: 12/050,632

(22) Filed: Mar. 18, 2008

(65) Prior Publication Data

US 2009/0238212 A1    Sep. 24, 2009

(51) Int. Cl.
*H04J 3/00* (2006.01)

(52) U.S. Cl. ........ 370/498; 370/294; 375/140; 375/295; 375/316

(58) Field of Classification Search .................. 370/294, 370/486, 342, 498; 375/140, 316; 725/37, 725/118
See application file for complete search history.

(56) References Cited

U.S. PATENT DOCUMENTS

| | | | |
|---|---|---|---|
| 7,283,566 B2 * | 10/2007 | Siemens et al. | 370/486 |
| 7,321,946 B2 | 1/2008 | Olson | |
| 2003/0169831 A1 * | 9/2003 | Neugebauer et al. | 375/316 |
| 2006/0036788 A1 | 2/2006 | Galang et al. | |
| 2007/0279408 A1 | 12/2007 | Zheng et al. | |
| 2008/0159356 A1 * | 7/2008 | Niu et al. | 375/133 |
| 2008/0187028 A1 * | 8/2008 | Lida | 375/140 |
| 2008/0247341 A1 * | 10/2008 | Lee | 370/294 |
| 2008/0250294 A1 * | 10/2008 | Ngo et al. | 714/752 |
| 2008/0271073 A1 * | 10/2008 | Kim et al. | 725/37 |
| 2008/0288995 A1 * | 11/2008 | Diab et al. | 725/118 |
| 2009/0046690 A1 * | 2/2009 | Hsieh | 370/342 |

* cited by examiner

*Primary Examiner* — Aung S Moe
*Assistant Examiner* — Vincelas Louis
(74) *Attorney, Agent, or Firm* — Myers Wolin, LLC (57) ABSTRACT

A system and method for transferring high-definition multimedia signals over four twisted-pairs. The system includes a multimedia source for transmitting multimedia data and source-to-sink management data to a multimedia sink over a first channel, a second channel and a third channel wherein the multimedia source is further being capable of transmitting a clock signal to the multimedia sink over a fourth channel; and a multimedia sink for transferring sink-to-source management data to the multimedia source over the fourth channel. The clock signal and the sink-to-source management data are simultaneously transmitted over the fourth channel. Each of the channels comprises a single twisted-pair, thereby the channels can bounded in a twisted pair type cable comprising at least one of: Category 5, Category 5e, Category 6, and Category 6e.

33 Claims, 5 Drawing Sheets

Fig. 5

SYSTEM AND METHOD FOR TRANSFERRING HIGH-DEFINITION MULTIMEDIA SIGNALS OVER FOUR TWISTED-PAIRS

TECHNICAL FIELD

This invention generally relates to electronic display device connectivity.

BACKGROUND OF THE INVENTION

The high-definition multimedia interface (HDMI™) is a licensable compact audio/video connector interface for transmitting uncompressed digital streams. The HDMI connects digital audio/video (or multimedia) sources (e.g., a set-top box, a DVD player, a personal computer, a video game console, etc.) to a compatible digital audio device and/or video monitor such as a digital television. In contrast to consumer analog standards the HDMI enforces digital rights management (DRM) on transmitted media. The HDMI is fully described in the HDMI™ Specification version 1.3 published on Jun. 22, 2006, incorporated herein by reference in its entirety merely for the useful understanding of the background of the invention.

Figure 1:
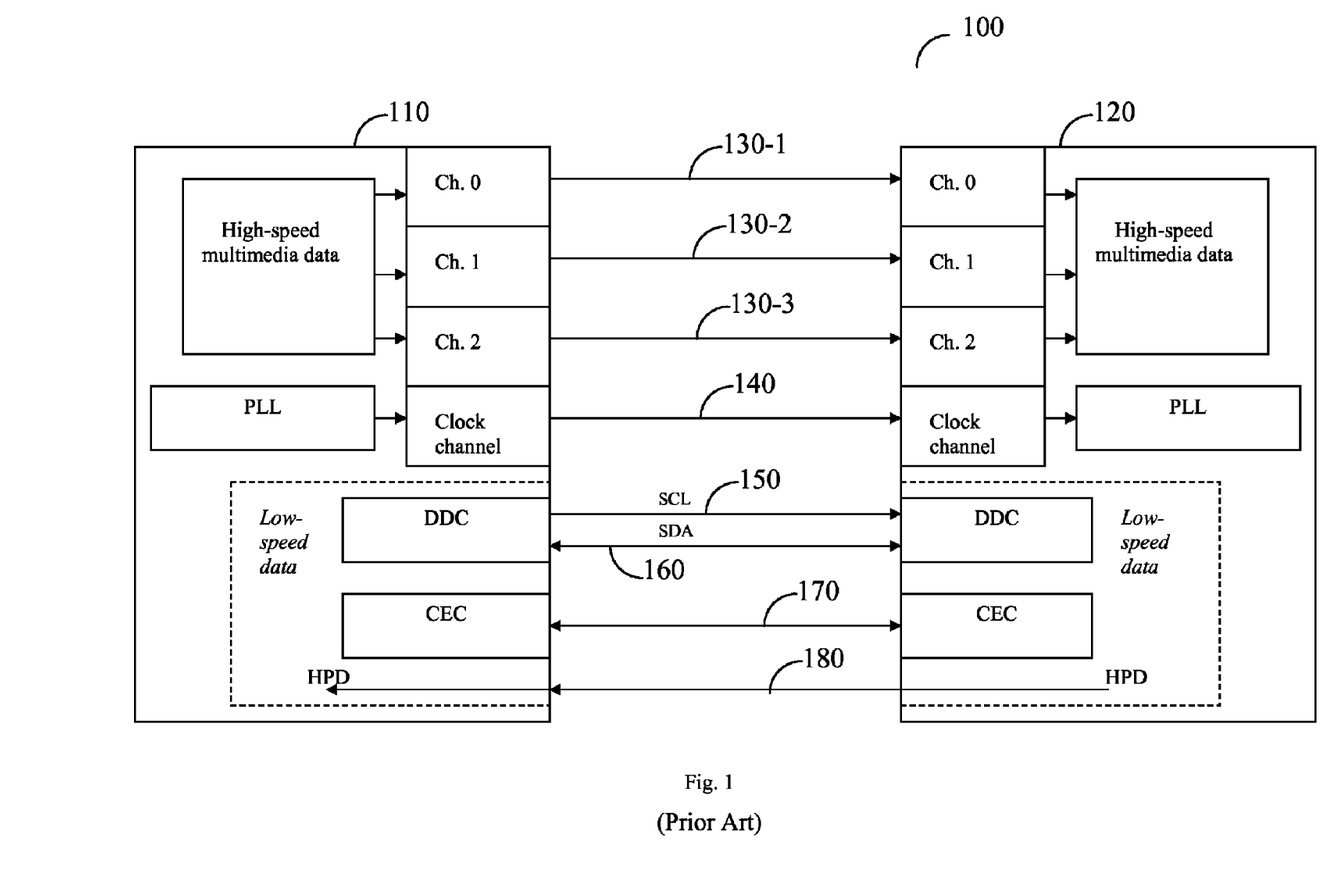
FIG. 1 is a block diagram of an HDMI link.

A block diagram of a HDMI link 100 is shown in FIG. 1. A multimedia source 110 transmits high speed data using transition minimized differential signaling (TMDS®) characters. The TMDS characters encapsulate video, audio, and auxiliary data and are carried over three TMDS channels 130-1, 130-2, and 130-3. TMDS characters are transported at three different time periods: a video data period, a data island period, and a control period. During the video data period, the pixels of an active video line are transmitted. During the data island period, which occurs during the horizontal and vertical blanking intervals, audio and auxiliary data are transmitted within a series of packets. Control codes are transported during the control period, which occurs between video and data island periods. The control codes include, for example, encryption status signals (ESS), HSYNC signals, VSYNC signals, and delimiters. A multimedia sink 120 receives the TMDS characters and converts them into digital video streams, data packets, ESS, HSYNC and VSYNC signals.

A clock, typically running at the video pixel rate, is transmitted on a clock channel 140 and is used by the multimedia sink 120 as a frequency reference for data recovery on the three TMDS channels 130. In addition, configuration, system-level control, management and status information is exchanged between the multimedia source 110 and the multimedia sink 120. The system-level control includes display data channel (DDC) and consumer electronics control (CEC) which are transmitted over channels: SCL 150, SDA 160, and CEC 170. The DDC is used for exchanging configuration and status information between the multimedia source 110 and sink 120. The CEC protocol provides high-level control functions between all of the various audiovisual products in a user's environment. The SDA 160 and CEC 170 are bidirectional channels, while the SCL 150 is unidirectional channel (from source 110 to sink 120). A standard HDMI interface further includes a hot-plug detect (HPD) signal 180 which originates at the sink 120.

As can be noticed, at least eight channels are required to implement the HDMI link 100, where each channel is a twisted-pair wire. Typically, the multimedia source 110 and multimedia sink 120 are physically coupled using an HDMI cable that is designed to channel at least the signals 130 through 180. The HDMI standard defines different categories of HDMI cables, each of which has a different purpose and a unique connector type. The performance of a typical HDMI cable is usually a function of its length. For example, high quality cables can reach, at most, up to 15 meters. Another disadvantage of standard HDMI cables is their cost. Typically, such cables are significantly more expensive than other cabling standards, e.g., coaxial and RCA cabling.

Some prior art approaches utilize a dual category 5 (Cat-5) cable to replace a standard HDMI cable. The price of a Cat-5 cable is a fraction of what retailers charge for an HDMI cable. Cat-5 is a twisted pair cable type designed for high signal integrity. This type of cable is often used in structured cabling for computer networks (e.g., Ethernet) and many other signals such as basic voice services. A Cat-5 cable includes four twisted pairs in a single cable jacket. This use of balanced lines helps preserve a high signal-to-noise ratio despite interference from both external sources and other pairs.

However, to implement an HDMI interface, two Cat-5 cables are required to channel signals 130 through 180. This is a limiting factor, as connection through two Cat-5 cables is generally undesired for aesthetic reasons and/or installation convenience and cost compared to a single Cat-5 cable. Furthermore, as in many structures, every room is wired using only a single Cat-5 cable (and RJ-45 connectors). Thus, it would be desirable to have transmission of HDMI signals from a multimedia source to a multimedia sink over a single Cat-5 cable.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 2:
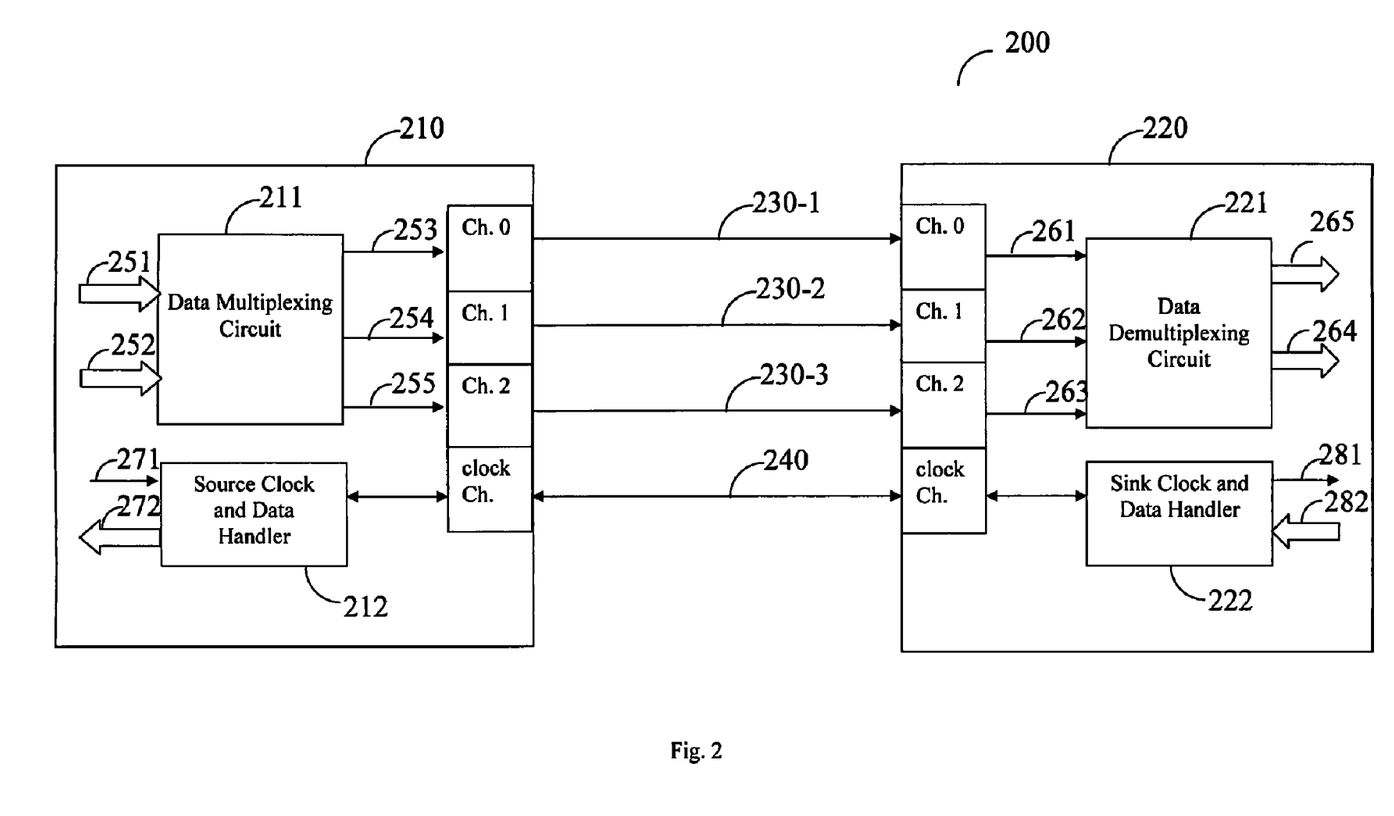
FIG. 2 is a block diagram of a system for transferring high definition multimedia signals constructed in accordance with an embodiment of the invention.

FIG. 2 shows an exemplary and non-limiting block diagram of a system 200 for transferring signals, for example high definition multimedia signals, over four twisted pairs constructed in accordance with an embodiment of the invention. Specifically, in an exemplary embodiment the system 200 transfers high speed multimedia data, a clock, and control data signals between a multimedia source 210 and a multimedia sink 220 over four twisted pairs. The multimedia source 210 includes a data multiplexing circuit 211 and a source clock and data handler 212. The multimedia sink 220 comprises a data demultiplexing circuit 221 and a sink clock and data handler 222.

The data multiplexing circuit 211 multiplexes high speed multimedia data 251 and low speed data 252 into at most three output signals 253, 254, and 255. The three signals are carried over three channels 230-1, 230-2 and 230-3 from the source 210 to the sink 220. In an embodiment of invention, the high speed data 251 includes video, audio, and auxiliary data preferably encapsulated in TMDS characters. The high speed data is transferred at a high rate (e.g., 50 Mega Hz) from the multimedia source 210 to multimedia sink 220. In addition, the channels 230-1, 230-2 and 230-3 are TMDS channels that transport TMDS characters at a pixel rate which is synchronized with a TMDS clock sent over a channel 240. A pixel rate determines the number pixels transmitted per second and it is typically higher than 25 Mega pixels per second.

The low speed data 252 comprises configuration, control, management and status information, which is only sent from the multimedia source 210 to the multimedia sink 220. Specifically, the low-speed data 252 may include SCL, SDA and CEC signals which are typically transferred at a rate (e.g., 500 Kilo Hz) lower than the pixel rate. The low speed data 252 will be referred hereinafter as "source-to-sink management data."

The data demultiplexing circuit 221 demultiplexes the signals 261, 262, and 263 received on channels 230 to produce the source-to-sink management data (e.g., SCL, SDA and CEC signals) on an output 264 and the high speed data on an output 265. The high speed data includes three different multimedia data streams. The operation of the data multiplexing and data demultiplexing circuits 211 and 221 are described in greater detail below.

The sink clock and data handler 212 and sink clock and data handler 222 together enable transferring, without interference, low speed data in the sink-to-source direction and a clock in the source-to-sink direction over the channel 240. A clock 271 is generated by the multimedia source 210 and transmitted to the multimedia sink 220 over the channel 240. The clock is recovered by the sink clock and data handler 222 which outputs a clock 281. The clock signal 281 is used as a frequency reference for data recovery on the channels 230. The low speed data (hereinafter the "sink-to-source management data") provided on an input 282 includes at least HDP, SDA and CEC signals transmitted over the channel 240 from the multimedia sink 220 to multimedia source 210. The sink-to-source management data is transferred at a rate which is significantly lower than the rate of clock 271. The source clock and data handler 212 outputs the sink-to-source management data on an output 272. The operation of the source clock and data handler 212 and sink clock and data handler 222 will be described in detail below.

As can be clearly noticed from FIG. 2 the high definition multimedia (e.g. HDMI) signals are transported over four channels 230-1, 230-2, 230-3, and 240. Each such channel carries signals over a single twisted-pair. Thus, only four twisted-pairs are needed to transport the HDMI signals. Therefore, as a standard twisted pair type cable includes four twisted pairs in a single cable jacket, the source video 210 and the sink video 220 can be physically connected using such a cable. A twisted pair type cable includes, but is not limited to, Category 5, Category 5e, Category 6, Category 6e, and the likes. In an exemplary embodiment the transmission of signals between the source video 210 to the sink video 220 is fully compliant with the HDMI standard.

Figure 3:
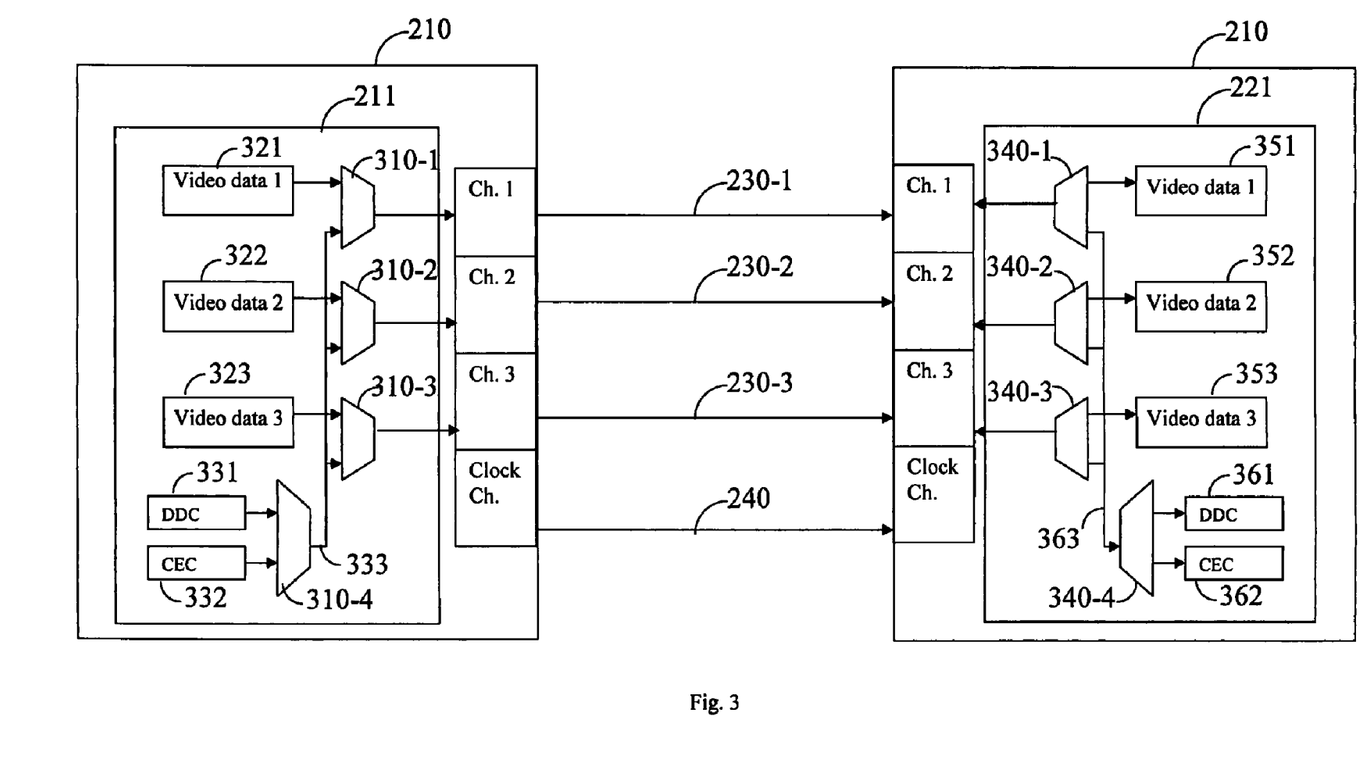
FIG. 3 is a block diagram of a data multiplexing circuit and a data demultiplexing circuit implemented in accordance with an embodiment of the invention.

FIG. 3 shows an exemplary and a non-limiting block diagram of the data multiplexing circuit 211 and data demultiplexing circuit 221 implemented in accordance with an embodiment of the invention. The data multiplexing circuit 211 includes four multiplexers 310-1, 310-2, 310-3 and 310-4. The multiplexer 310-4 generates and outputs a source-to-sink management data on an output 333 by multiplexing DDC 331 and CEC 332 signals. Each of multiplexers 310-1, 310-2, and 310-3 respectively receives one of the high speed data streams 321, 322, and 323 as well as the data on output 333 and interleaves a data stream and the source-to-sink management data on a respective channel 230.

As mentioned above, in an HDMI interface multimedia data is sent during a video period, audio and auxiliary data is transferred during a data island period, a control code is sent during the remaining blanking period. The HDMI standard defines a required minimum duration of a control period and a partial use of specific portions of the control period. The remaining allocated time of the control period is available for transmission of special purpose data.

In accordance with an embodiment of the invention the source-to-sink management data 333 is represented as control codes using user-defined semantics. The user-defined control codes are transmitted at a high rate during the control period. As a non-limiting example, a video frame has 1900 pixels and 1000 lines. For each 1000 video clock cycles, there is a horizontal blanking period of 100 clock cycles. For each 1000 lines, there are 50 blank lines. The total number of video clock cycles per frame is (1900+100)*(1000+50)=2,100,000. The HDMI standard prescribes a keep-out period of 122 clock cycles during vertical blanking and a keep-out period of 58 clock cycles during horizontal blanking. Therefore, 58,122 (58*1000+122=58,122) clock cycles per frame are available for user-defined control codes. If a frame rate is 50 Hz, the maximum user-defined control codes rate is 2.9M control codes per second.

It should be noted that representation of the source-to-sink management data as control codes is compatible with all aspects of the HDMI standard. An HDMI receiver usually ignores control codes with unknown semantics. However, the user defined control codes can be interpreted by the data demultiplexing circuit 221.

The data demultiplexing circuit 221 includes four demultiplexers 340-1, 340-2, 340-3, and 340-4 which produce the data streams 351, 352, and 353 as well as DDC 361 and CEC 362 signals. First, each of the demultiplexers 340-1, 340-2, and 340-3 demultiplexes the respective data stream and the source-to-sink management data from the signals received on channels 230. Then, the DDC 361 and CEC 362 are derived from management data received on input 363 using demultiplexer 340-4.

It should be noted that the source-to-sink management data is transmitted at a high rate during the control period and pixel data of the multimedia media is sent during the video period, therefore the bandwidth of the transmitted video is not reduced. Furthermore, multimedia data is transmitted as defined in the HDMI standard.

Figure 4:
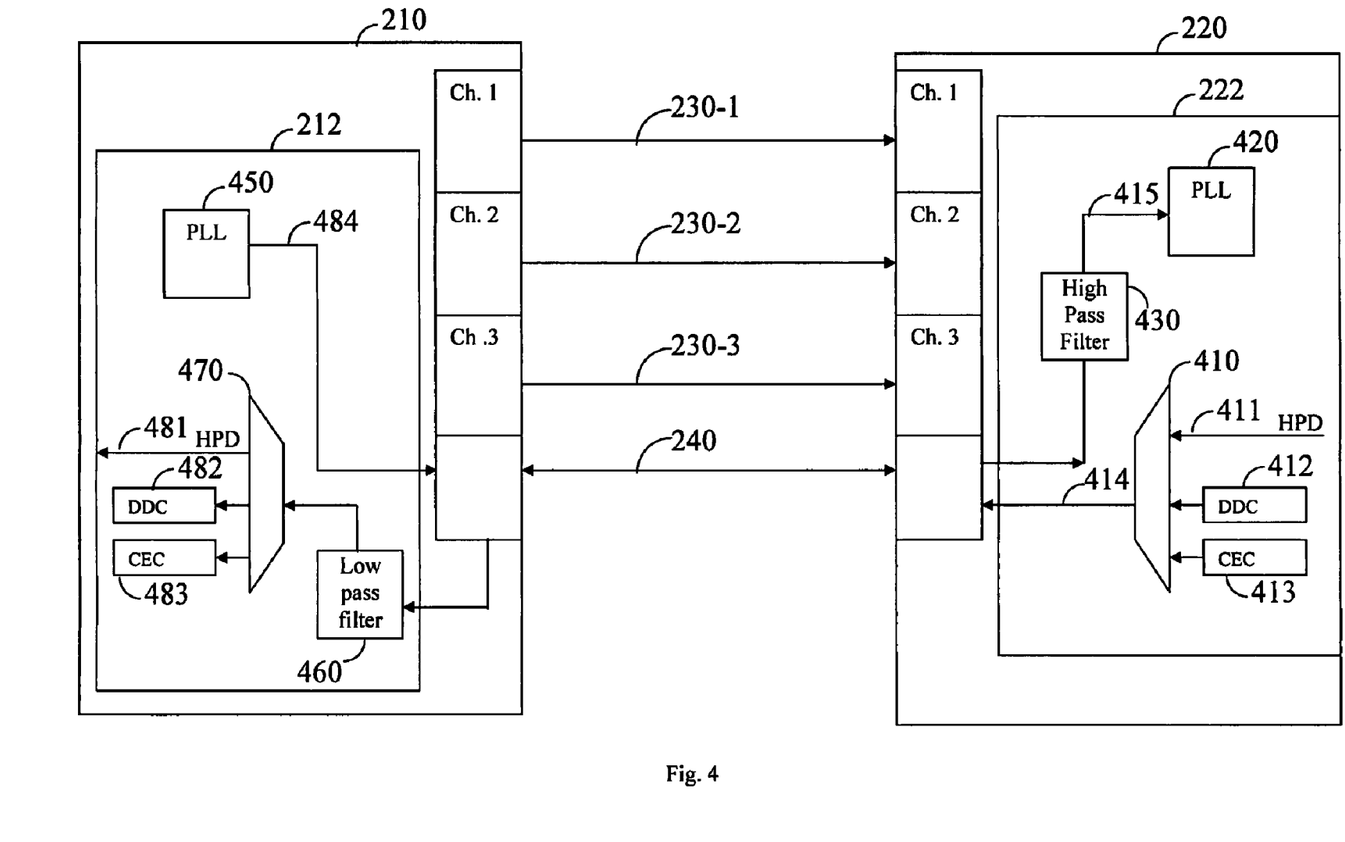
FIG. 4 is a block diagram of a source clock and data handler and a sink clock and data handler implemented in accordance with an embodiment of the invention.

FIG. 4 shows an exemplary and non-limiting block diagram of the handlers 212 and 222 implemented in accordance with an embodiment of the invention. The clock sink clock and data handler 222 comprises a multiplexer 410, a phase-locked loop (PLL) circuit 420, and a high-pass filter 430. The multiplexer 410 multiplexes the HDP 411, DDC 412 and CEC 413 signals and outputs, on an output 414, the sink-to-source management data. The output 414 is connected to the channel 240 to transport the sink-to-source management data to multimedia source 210. A clock sent from the source 210 over the channel 240 is fed to the high-pass filter 430 to extract the clock signal. The frequency of the clock is significantly higher than the transmission rate of the sink-to-source management data. For example, the clock frequency is 50 MHz and the management data transfer rate is 500 kHz. Therefore, the high-pass filter 430 passes only a clock 415 to the PLL circuit 420, which is used for a clock recovery.

At the multimedia source 210, the source clock and data handler 212 comprises a PLL circuit 450, a low-pass filter 460 and a demultiplexer 470. The low-pass filter 460 passes only low frequency data, i.e., recovers the sink-to-source management data from the signal carried over the channel 240. The management data is fed to the demultiplexer 470 which outputs three control signals: HDP 481, DDC 482, and CEC 483. The PLL circuit 450 generates a clock 484 at a base frequency of a pixel rate. The clock 484 is transmitter over the channel 240 to the multimedia sink 210.

In accordance with an embodiment of the invention the circuits 212 and 222 can implement multiplexing/demultiplexing techniques other than the frequency multiplexing/demultiplexing described above. These techniques include, but are not limited to, timing multiplexing/demultiplexing, superposition of signals with echo canceling, and so on.

Figure 5:
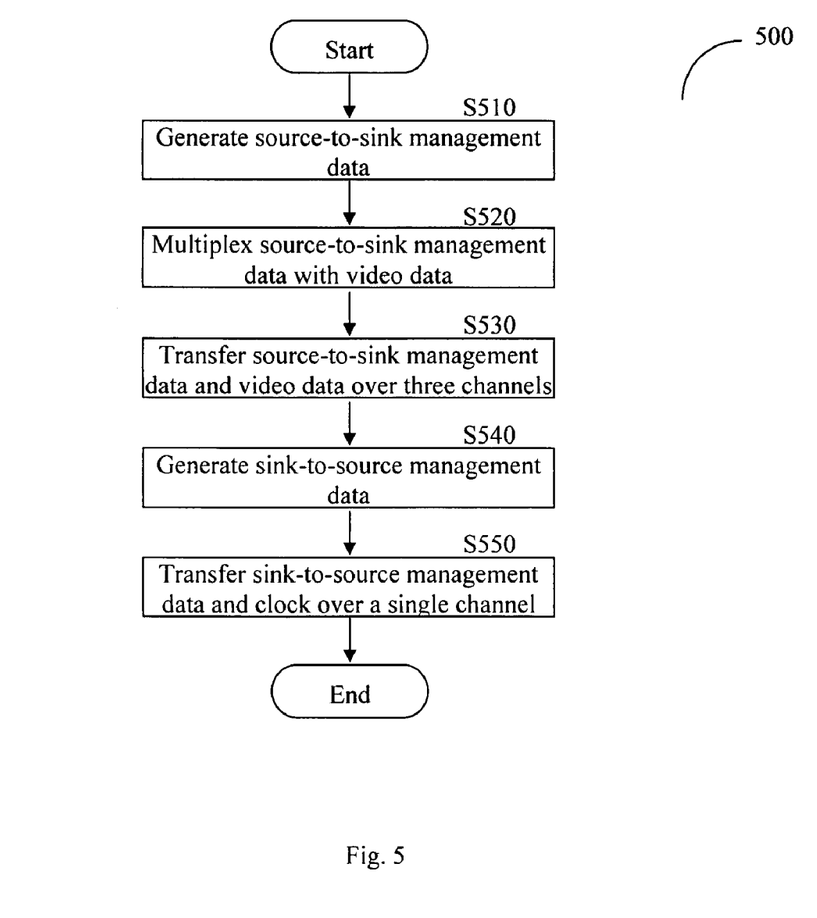
FIG. 5 is a flowchart describing a method for transferring high definition multimedia signals over four twisted pairs implemented in accordance with an embodiment of the invention.

FIG. 5 shows an exemplary and a non-limiting flowchart 500 describing a method for transferring signals, for example high definition multimedia signals, over four twisted pairs implemented in accordance with an embodiment of an invention. The steps of FIG. 5 may be performed in order or in parallel. In a specific embodiment, the high definition multimedia signals comprise TMDS characters, a clock, and control data. The control data includes the CEC, DDC, and HPD signals which are transported at a low rate (e.g., 500 kHz). The TMDS characters are sent from a multimedia source to a multimedia sink at a high rate (e.g., 50 mega Hz).

At S510, source-to-sink management data is generated by multiplexing DDC and CEC signals that should be sent to the multimedia sink. At S520, the source-to-sink management data is multiplexed with high speed multimedia data. Thereafter, at S530 the multiplexed signals are transmitted over three channels (e.g., channels 230) at a high speed rate. Each channel carries signals over a single twisted-pair. As described in detail above, the source-to-sink management data is sent using predefined control codes during the control period of the TMDS transmission. At the multimedia sink, a demultiplexing process is performed to recover the DDC and CEC signals as well as the video streams.

At S540, sink-to-source management data is generated by multiplexing DDC, HPD and CEC signals. At S550 the sink-to-source management data is sent from the multimedia sink to the multimedia source over a fourth channel. Simultaneously, a clock signal (e.g., a TMDS clock) is sent from the source video also over the fourth channel. That is, the fourth channel carries, over a single twisted pair, the clock signal and a sink-to-source management data without interference between them. This is achieved using a multiplexing technique including, but not limited to, time multiplexing (e.g., transmitting 10,000 clocks and then freeing the line for data transmission during a period of 100 clock cycles), frequency multiplexing, and superposition of signals with echo canceling. The clock signal is recovered at the multimedia sink and the sink-to-source management data is demultiplexed, at the multimedia source, to generate the DDC, HPD and CEC signals.

The invention has been now described with a reference to a specific embodiment where the disclosed system and method are utilized to transfer HDMI signals over a four twisted pairs. However, other embodiments would be apparent to one of ordinary skill in the art. For example, the invention described herein can be easily adopted to transmit signals of other digital display interface standards, such as a digital visual interface (DVI), and the like.

The principles of the invention may be implemented in hardware, software, firmware or any combinations thereof. The software may be implemented as an application program tangibly embodied on a program storage unit or computer readable medium. The application program may be uploaded to, and executed by, a machine comprising any suitable architecture, for example a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

All statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included.

The invention claimed is:

1. A system for transferring high definition multimedia signals over a cable having four channels, comprising:

a multimedia source for transmitting multimedia data and source-to-sink management data to a multimedia sink over a first channel, a second channel and a third channel, wherein a transfer rate of the multimedia data is higher than a transfer rate of the source-to-sink management data, the multimedia source includes at least one source multiplexer for, generating the source-to-sink management data by multiplexing a display data channel (DDC) signal and a consumer electronics control (CEC) signal to be transmitted together over a single channel, wherein the single channel is any one of the first channel, the second channel, and the third channel, and wherein the multimedia source is further capable of transmitting a clock signal to the multimedia sink over a fourth channel; and the multimedia sink for transferring sink-to-source management data to the multimedia source over the fourth channel, wherein a transfer rate of the clock signal is higher than a transfer rate of the sink-to-source management data, the multimedia sink includes a sink multiplexer for generating the sink-to-source management data by multiplexing a DDC signal, a CEC signal, and a hot plug detect (HPD) signal to be transmitted together over the fourth channel, and wherein the sink-to-source management data and the clock signal are simultaneously transferred over the fourth channel, thereby transferring the high definition multimedia signals including the multimedia data, the source-to-sink management data, the sink-to-source management data, and the clock signal over the cable.

2. The system of claim 1, wherein each of the first channel, second channel, third channel and fourth channel comprises a single twisted pair, thereby the signals are transferred over four twisted pairs.

3. The system of claim 2, wherein the four twisted pairs are bounded in a twisted pair type cable comprising at least one of: Category 5, Category 5e, Category 6, and Category 6e.

4. The system of claim 1, wherein the multimedia source comprises:
   a data multiplexing circuit for interleaving the multimedia data and the source-to-sink management data; and
   a source clock and data handler for transferring the clock signal over the fourth channel and filtering the sink-to-source management data received on the fourth channel from the multimedia sink.

5. The system of claim 1, wherein the multimedia sink comprises:
   a data demultiplexing circuit for de-interleaving the multimedia data and the source-to-sink management data received on the first channel, the second channel, and the third channel; and
   a sink clock and data handler for transferring the sink-to-source management data generated by the sink multiplexer over the fourth channel and filtering the clock signal received on the fourth channel from the multimedia source, the sink clock and data handler sink multiplexer.

6. The system of claim 1, wherein the multimedia data comprises at least: pixel data, audio data, and auxiliary data.

7. The system of claim 1, wherein the source-to-sink management data is transferred as user-defined control codes.

8. The system of claim 1, wherein the signals are at least high-definition multimedia interface (HDMI) signals.

9. The system of claim 8, wherein the multimedia data comprises transition minimized differential signaling (TMDS) characters.

10. A multimedia source adapted to enable the transfer of high definition multimedia signals over a cable having four channels, comprises:
    a data multiplexing circuit for transferring multimedia data and source-to-sink management data over a first channel, a second channel, and a third channel, wherein a transfer rate of the multimedia data is higher than a transfer rate of the source-to-sink management data, the multimedia source includes at least a first multiplexer for generating the source-to-sink management data by multiplexing a display data channel (DDC) signal and a consumer electronics control (CEC) signal to be transmitted together over a single channel, wherein the single channel is any one of the first channel, the second channel, and the third channel; and
    a source clock and data handler for filtering a sink-to-source management data received on a fourth channel and for transferring a clock signal to a multimedia sink over the fourth channel, wherein the sink-to-source management and the clock signal are simultaneously transmitted over the fourth channel, the sink-to-source management data received on the fourth channel includes a display data channel (DDC) signal, a consumer electronics control (CEC) signal, and a hot plug detect (HDP) signal.

11. The multimedia source of claim 10, wherein each of the first channel, second channel, third channel and fourth channel comprises a single twisted pair, thereby the signals are transferred over four twisted pairs.

12. The multimedia source of claim 11, wherein the four twisted pairs are bounded in a twisted pair type cable comprising at least one of: Category 5, Category 5e, Category 6, and Category 6e.

13. The multimedia source of claim 10, wherein the data multiplexing circuit comprises:
    a second multiplexer for multiplexing the source-to-sink management data with a first stream of the multimedia data;
    a third multiplexer for multiplexing the source-to-sink management data with a second stream of the multimedia data; and
    a fourth multiplexer for multiplexing the source-to-sink management data with a third stream of the multimedia data.

14. The multimedia source of claim 13, wherein the multimedia data comprises at least one of: pixel data, audio data, and auxiliary data.

15. The multimedia source of claim 10, wherein the source-to-sink management data is transferred as user-defined control codes.

16. The multimedia source of claim 15, wherein the source clock and data handler comprises:
    a low pass filter for filtering the sink-to-source management data;
    a demultiplexer for producing signals of the sink-to-source management data; and
    a phase-locked loop (PLL) circuit for generating the clock signal.

17. The multimedia source of claim 10, wherein the signals are at least high-definition multimedia interface (HDMI) signals.

18. The multimedia source of claim 17, wherein the multimedia data comprises transition minimized differential signaling (TMDS) characters.

19. A multimedia sink adapted to enable the transfer of high definition multimedia signals over a cable having four channels, comprises:
    a data demultiplexing circuit for extracting multimedia data and source-to-sink management data transferred over a first channel, a second channel, and a third channel, wherein the transfer rate of the multimedia data is higher than a transfer rate of the source-to-sink management data, wherein the source-to-sink management data is received on any of the first channel, the second channel, and the third channel and includes a display data channel (DDC) signal and a consumer electronics control (CEC) signal; and
    a sink clock and data handler for filtering a clock signal received on a fourth channel and for transferring sink-to-source management data to a multimedia source over the fourth channel, the multimedia sink includes a multiplexer for generating the sink-to-source management data by multiplexing a DDC signal, a CEC signal, and a hot plug detect (HPD) signal to be transmitted together over the fourth channel, wherein the sink-to-source management data and the clock signal are simultaneously transmitted over the fourth channel.

20. The multimedia sink of claim 19, wherein each of the first channel, second channel, third channel and fourth channel comprises a single twisted pair, thereby the signals are transferred over four twisted pairs.

21. The multimedia sink of claim 20, wherein the four twisted pairs are bounded in a twisted pair type cable comprising at least one of: Category 5, Category 5e, Category 6, and Category 6e.

22. The multimedia sink of claim 19, wherein the data demultiplexing circuit comprises:
- a first demultiplexer for demultiplexing the source-to-sink management data and a first stream of the multimedia data;
- a second demultiplexer for demultiplexing the source-to-sink management data and a second stream of the multimedia data; and
- a third demultiplexer for demultiplexing the source-to-sink management data and a third stream of the multimedia data; and
- a fourth demultiplexer for outputting the signals of the source-to-sink management data.

23. The multimedia sink of claim 22, wherein the multimedia data comprises at least one of: pixel data, audio data, and auxiliary data.

24. The multimedia sink of claim 19, wherein the source-to-sink management data is transferred as user-defined control codes.

25. The multimedia sink of claim 19, wherein the sink clock and data handler comprises:
- a high pass filter for filtering the clock signal; and
- a phase-locked loop (PLL) circuit for recovering the clock signal.

26. The multimedia sink of claim 19, wherein the signals are at least high-definition multimedia interface (HDMI) signals.

27. The multimedia sink of claim 26, wherein the multimedia data comprises transition minimized differential signaling (TMDS) characters.

28. A method for transferring high definition multimedia signals over a cable having four channels, comprising:
- generating source-to-sink management data by multiplexing a display data channel (DDC) signal and a consumer electronics control (CEC) signals to be transmitted together over a single channel;
- transferring multimedia data and the source-to-sink management data from a multimedia source to a multimedia sink over a first channel, a second channel, and a third channel of the cable by interleaving the source-to-sink management data and the multimedia data, wherein the transfer rate of the multimedia data is higher than a transfer rate of the source-to-sink management data;
- generating sink-to-source management data by multiplexing a DDC signal, a CEC signal, and a hot plug detect (HPD) signal to be transmitted together over a fourth channel of the cable; and
- simultaneously transferring the sink-to-source management data and a clock signal over the fourth channel, wherein the sink-to-source management data is transferred from the multimedia sink to the multimedia source and the clock signal is transferred from the multimedia source to the multimedia sink, and wherein a transfer rate of the clock signal is higher than a transfer rate of the sink-to-source management data.

29. The method of claim 28, wherein each of the first channel, second channel, third channel and fourth channel comprises a single twisted-pair, thereby the signals are transferred over four twisted pairs.

30. The method of claim 29, wherein the four twisted pairs are bounded in a twisted pair type cable comprising at least one of: Category 5, Category 5e, Category 6, and Category 6e.

31. The method of claim 28, further comprising:
- demultiplexing the multimedia data and the source-to-sink management data received on the first channel, the second channel, and the third channel;
- filtering the clock signal sent on the fourth channel from the multimedia source; and
- filtering the sink-to-source management data sent on the fourth channel from the multimedia sink.

32. The method of claim 28, wherein the signals are at least high-definition multimedia interface (HDMI) signals.

33. The method of claim 32, wherein the multimedia data comprises transition minimized differential signaling (TMDS) characters.

* * * * *